United States Patent

Leng et al.

[11] 3,956,265
[45] May 11, 1976

[54] MONOAZO HYDROXY PYRIDONE DYESTUFFS CONTAINING A METHYLENE PIPERIDINO GROUP

[75] Inventors: John Lindley Leng; David Frederick Newton, both of Manchester, England

[73] Assignee: Imperial Chemical Industries Limited, London, England

[22] Filed: Dec. 17, 1973

[21] Appl. No.: 425,283

[30] Foreign Application Priority Data
Dec. 27, 1972 United Kingdom............... 59620/72

[52] U.S. Cl............................... 260/156; 260/37 R; 260/37 N; 260/40 R; 260/42.21; 260/297 Z; 428/423; 428/474; 428/480; 428/500
[51] Int. Cl.²..................... C09B 29/36; D06P 3/24; D06P 3/52; D06P 3/70
[58] Field of Search..................................... 260/156

[56] References Cited
UNITED STATES PATENTS

| | | | |
|---|---|---|---|
| 3,213,078 | 10/1965 | Benz et al........................ | 260/146 D |
| 3,248,379 | 4/1966 | Stanley .................. | 260/199 |
| 3,252,964 | 5/1966 | Fuchs et al. ......................... | 260/152 |
| 3,314,933 | 4/1967 | Elslager et al. ...................... | 260/156 |
| 3,468,892 | 9/1969 | Tomcufik et al. .............. | 260/156 X |
| 3,640,674 | 2/1972 | Berrie et al. ...................... | 260/156 X |
| 3,657,214 | 4/1972 | Berrie et al. ........................ | 260/156 |
| 3,725,383 | 4/1973 | Austin............................ | 260/146 T |
| 3,853,895 | 12/1974 | Lamm et al...................... | 260/249.9 |

*Primary Examiner*—Floyd D. Higel
*Attorney, Agent, or Firm*—Cushman, Darby & Cushman

[57] ABSTRACT

Azo dyestuff free from carboxylic acid or sulphonic acid groups selected from the group consisting of
a. a dyestuff of the formula

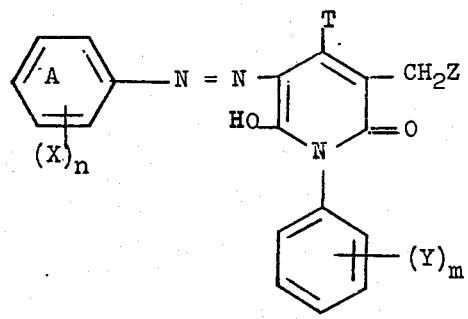

wherein
X is chlorine, bromine, iodine, —COOCH₃, —COOC₂H₅, —COCH₃, —COC₆H₅, —COC₂H₅, cyano or trifluoromethyl,
Y is hydrogen, methyl, ethyl, methoxy, ethoxy, chlorine, bromine, nitro, cyano, —COOCH₃, —COOC₂H₅, —COCH₃, —COC₂H₅, trifluoromethyl or alkylene forming with the phenyl ring 1-naphthyl,
Z is tertiary amino,
T is lower allyl or phenyl,
the ring A can be substituted with (X)ₙ alone or further substituted with lower alkyl or methoxy and
b. a salt of the dyestuff of (a) with an organic or inorganic acid.

The dyestuffs are useful for dyeing polymeric fibers, especially polyacrylonitrile fibers and impart strong shades to the fibers dyed therewith.

10 Claims, No Drawings

MONOAZO HYDROXY PYRIDONE DYESTUFFS CONTAINING A METHYLENE PIPERIDINO GROUP

This invention relates to new azo dyestuffs and their salts useful for the coloration of polymeric materials in the form of fibres, films, threads or tapes particularly polymeric materials consisting of polyesters, polyamide or cellulose esters especially polymers or copolymers of acrylonitrile or cyanoethylene.

U.S. Application Ser. No. 212,634 filed Dec. 27, 1971, and now U.S. Pat. No. 3,869,441, is directed to azo dyestuffs free from carboxylic acid or sulphonic acid groups of the formula

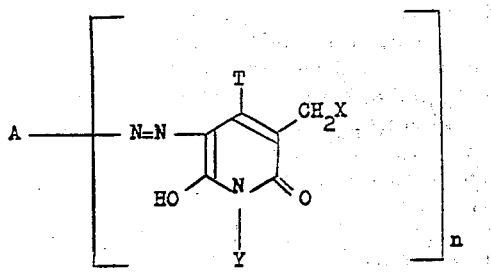

wherein A is an aromatic radical, X is a tertiary amino group, Y is a hydrogen atom or an optionally substituted alkyl, alkenyl, aralkyl, cycloalkyl or aryl radical, T is a lower alkyl or aryl group and $n$ is 1 or 2 and salts thereof, to the preparation of such dyestuffs and to their use in the coloration of textile materials.

Thus according to the present invention there are provided azo dyestuffs free from carboxylic acid or sulphonic acid groups and of the formula (I)

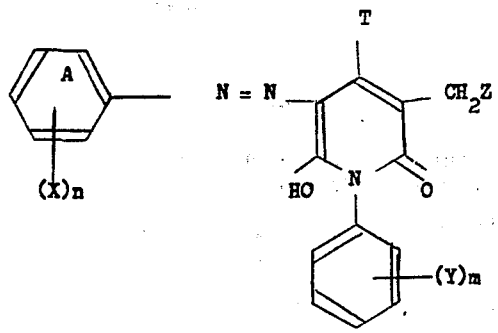

wherein X is an electron-withdrawing substituent selected from the group halogen, carboxylic acid ester, cyano, trifluoromethyl and acyl, Y is hydrogen or a non-ionogenic substituent selected from the group halogen, alkyl, alkoxy, nitro, carboxylic acid ester, acyl, cyano and trifluoromethyl or Y is an alkylene group forming a fused ring with the phenyl ring, Z is a tertiary amino group, T is a lower alkyl or aryl group, $n$ is 1 or 2 and $m$ is 1 or 2 preferably 1 and the ring A may optionally be further substituted with alkyl or alkoxy groups.

By the term lower alkyl is meant an alkyl group with from 1 to 4 carbon atoms.

According to the present invention there are also provided salts of the dyestuffs of Formula I with inorganic or organic acids.

The azo dyestuffs of the invention can exist in a number of tautomeric forms; for convenience the dyestuffs have only been formulated in one of these tautomeric forms, but it is to be understood that this invention includes within its scope the dyestuffs in any of the possible tautomeric forms.

As examples of electron-withdrawing substituents which may be represented by X there may be mentioned chlorine, bromine, iodine, $-COOCH_3$, $-COOC_2H_5$, $-COCH_3$, $-COC_6H_5$, $-COC_2H_5$, cyano and trifluoromethyl.

As examples of Y there may be mentioned hydrogen, methyl, ethyl, methoxy, ethoxy, chlorine, bromine, nitro, cyano, $-COOCH_3$, $-COOC_2H_5$, $-COCH_3$, $-COC_2H_5-$, $-COC_6H_5$ and trifluoromethyl, and the group Y may be an alkylene group forming a fused ring with the phenyl group to give for example a 1-naphthyl group.

The tertiary amino group represented by Z may be of the formula $-NR^1R^2$ wherein $R^1$ is an alkyl, alkenyl, aralkyl, or cycloalkyl group or a substituted derivative thereof and $R^2$ is a group of the type represented by $R^1$ or an aryl or substituted aryl group or, alternatively the groups $R^1$ and $R^2$ together with the nitrogen atom form a heterocyclic ring.

As groups which may be represented by $R^1$ or $R^2$ there are mentioned alkyl groups, for example methyl, ethyl, isopropyl and tert.-butyl, substituted alkyl groups, for example $\beta$-hydroxyethyl, $\beta$-cyanoethyl and $\gamma$-methoxy propyl, alkenyl groups for example allyl, cycloalkyl groups for example cyclopentyl and cyclohexyl, substituted cycloalkyl groups for example chlorocyclohexyl and methoxycyclohexyl, aralkyl groups for example benzyl and $\beta$-phenylethyl, and substituted aralkyl groups for example p-nitrobenzyl, p-methoxybenzyl and $\beta$-(4-chlorophenyl)ethyl.

As optionally substituted aryl groups which may be represented by $R^2$ there are mentioned phenyl, o-, m- and p-tolyl, o-, m- and p-chlorphenyl and p-methoxyphenyl.

As heterocyclic groups which may be formed by $R^1$, $R^2$ and the nitrogen atom there are mentioned for example especially piperidino but also morpholino, pyrrolidino, thiamorpholino, piperazino and hexahydroazepino.

As lower alkyl groups which are represented by T there may be mentioned alkyl groups containing not more than 4 carbon atoms, especially the methyl group.

As aryl groups which may be represented by T there are mentioned for example phenyl and o-, m- and p-tolyl groups. The integer $n$ may be 1 or 2 and $m$ may be 1 or 2 preferably 1.

As salts of the azo dyestuffs there are mentioned for example salts with inorganic acids, such as hydrochloric acid, sulphuric acid, phosphoric, sulphamic and boric acid, and with organic acids such as formic acid, acetic acid, propionic acid, citric acid, oxalic acid, and mono, di and trichloracetic acids.

These salts may be obtained in aqueous solution by dissolution of the amine in water with an equivalent quantity of the acid and may be isolated by evaporation of the aqueous solution, or by salting out the dye from the aqueous solution. In some cases the dye is isolated as its tetrachlorozincate by addition of salt and zinc chloride to its aqueous solution.

Alternatively, the dye free base may be ground with a solid water-soluble acid such as sulphamic or citric acid and then pasted with a little aqueous acetic or propionic acid to give a water-soluble dyestuff.

According to the invention there is also provided a process for the preparation of dyestuffs of the formula I which comprises reacting a halogenomethyl compound of the formula

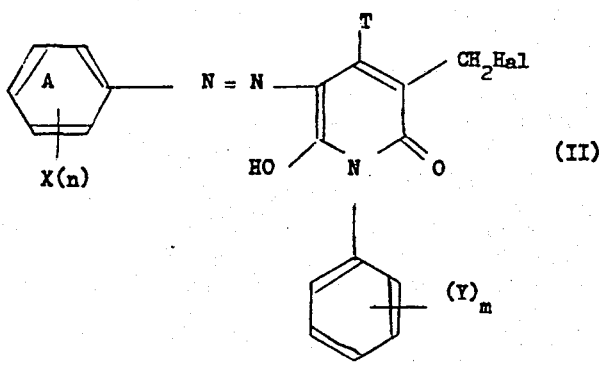

wherein A, T, Y and $n$ have the meanings given hereinbefore and Hal is a chlorine or bromine atom, with a second amine of the formula $NHR^1R^2$ wherein $R^1$ and $R^2$ have the meanings given hereinbefore.

The process of the invention may be carried out by heating together equivalent quantities of the halogenomethyl compound and the secondary amine in a suitable inert solvent or in an excess of the secondary amine as solvent followed by isolation of the tertiary amine by conventional methods.

As examples of secondary amines there are mentioned alkyl-amines such as dimethylamine, diethylamine, di isopropylamine, substituted alkylamines such as diethanolamine, di-(γ-methoxypropyl) amine and N-methyl benzylamine, aromatic amines such as N-methyl aniline and N-phenyl benzylamine and heterocyclic amines such as pyrollidine, piperidine, morpholine, thiamorpholine, hexamethyleneimine, and piperazine.

The compounds of the Formula II used in the process of the invention may be prepared by halogenomethylation of an azohydroxypyridone of the formula

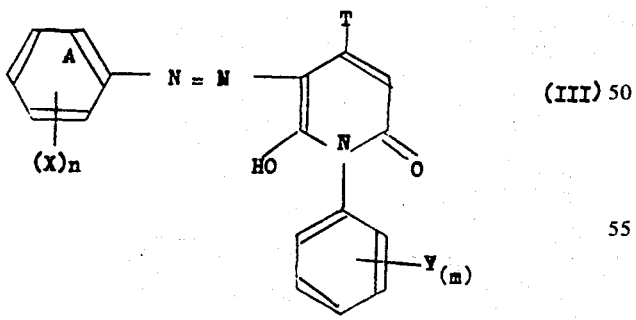

wherein X, T, Y, $n$ and $m$ have the meanings given hereinbefore.

The halogenomethylation may be carried out by any conventional procedure for this type of reaction, for example the azohydroxypyridone may be heated in a suitable solvent such as dioxane, chlorobenzene or an alcohol, with formaldehyde and hydrochloric acid.

Alternatively the azo pyridone compound may be treated with paraformaldehyde in a mixture of sulphuric and chlorosulphuric acids or with paraformaldehyde and sodium chloride in concentrated sulphuric acid or with sym-dichlorodimethyl-ether in concentrated sulphuric acid. These reactions are preferably carried out at a temperature of between 0° and 100°C.

There is also provided an alternative process for the preparation of dyestuffs of the formula I which comprises reacting a compound of the formula III with formaldehyde or a formaldehyde generator and a secondary amine of the formula $NHR^1R^2$, wherein X, T, Y, $m$, $n$, $R^1$ and $R^2$ have the meanings given hereinbefore.

The alternative process may be carried out under conventional conditions for this type of reaction (the Mannich reaction), for example the compound of formula III may be heated with a secondary amine of the formula $NHR^1R^2$ and with paraformaldehyde in an inert solvent such as dioxane, methanol, ethanol, isopropanol, toluene, ethylene glycol, acetic acid, and especially halogenated aromatic hydrocarbons such as chlorobenzene, o-dichlorobenzene, and bromobenzene and halogenated aliphatic compounds such as ethylene dichloride and propylene dichloride. The dyestuff so produced may then be isolated by precipitation with water followed by filtration or other conventional methods.

The azohydroxypyridones used as starting materials may be obtained by diazotizing an amine of the formula

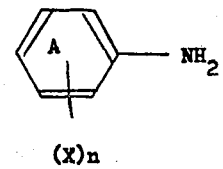

and coupling the diazonium compound with a hydroxypyridone of the formula

Examples of amines which may be used in preparing the starting materials include:

o-, or p-chloroaniline, o-, m- or p-bromoaniline, 3,4-dichloroaniline, 2,5-dichloroaniline, 4-aminobenzotrifluoride, methyl anthranilate, 2-cyanoaniline, 4-cyanoaniline, 2-cyano-4-chloroaniline, 2-cyano-5-chloroaniline, 2-chloro-4-methylaniline, 2-cyano-4-methylaniline, 2-chloro-4-cyanoaniline, 4-chloro-2-trifluoromethylaniline, 2,4-dicyanoaniline and 2-trifluoromethylaniline.

Examples of hydroxy pyridones which may be used in preparing the starting materials include:

1-(2'-chlorophenyl)-4-methyl-6-hydroxypyrid-2-one, 1-(2'-methylphenyl)-4-methyl-6-hydroxypyrid-2-one, 1-phenyl-4-methyl-6-hydroxypyrid-2-one, 1-(4'-methylphenyl)-4-methyl-6-hydroxypyrid-2-one and 1-(4'-chlorophenyl)-6-hydroxy-4-methylpyrid-2-one.

The azo dyestuff salts of the invention are valuable for obtaining colorations in strong shades on polymeric materials particularly in the form of textile materials especially those containing polymers and copolymers of acrylonitrile and of dicyanoethylene and polyester, polyamides and cellulose esters. The polymeric materials may be modified, for example acid-modified.

The dyestuff of the invention may be ground with a solid water soluble acid such as sulphamic or citric acids, pasted with aqueous acetic acid and dissolved in water to give aqueous solutions suitable for use in dyeing.

Alternatively, the dye free base may be dissolved in a suitable solvent, preferably an aqueous organic carboxylic acid, which may optionally contain a further solvent, giving a concentrated liquid formulation which does not form a sediment or crystallize on low-temperature storage. As examples of suitable solvents there may be mentioned acetic acid and propionic acid and as additional solvents methanol, propanol, ethylene glycol and ethanol.

Such liquid formulations of the dyestuff salts of the invention form a further feature thereof.

The dyestuff salts of the invention may be applied to polyamide, cellulose ester, or particularly polyacrylonitrile or polydicyanoethylene materials from aqueous solutions, preferably from acid, or neutral dyebaths (i.e. pH from 3 to 7) at temperatures between 40° and 120°C and preferably between 80° and 120°C or by printing techniques using thickened print pastes.

On polyacrylonitrile textile materials, especially when the polyacrylonitrile has been modified to contain acidic groups, bright shades are obtained which are distinguished by their good wet and light fastness and build up properties.

These dyestuff salts are also particularly valuable for coloration, preferably from neutral dyebaths, of polyamide and polyester polymeric materials which are modified to contain acidic groups.

The azo dyestuffs of the invention are also valuable as dyestuffs and may be applied from aqueous dispersion to polyamide, cellulose acetate and triacetate and polyester fibres.

The invention is illustrated but not limited by the following Examples in which all parts and percentages are by weight unless otherwise specified.

EXAMPLE 1

A mixture of 2.81 parts of 1-(2'-chlorophenyl)-4-methyl-5-(2'-chlorophenylazo)-6-hydroxypyrid-2-one, 0.45 parts of paraformaldehyde and 1.6 parts of piperidine in 33 parts of chlorobenzene is stirred and heated at 95°–100°C. for 20 hours. The chlorobenzene is removed by steam-distillation, and the resulting aqueous suspension adjusted to pH 2 with hydrochloric acid, diluted with 1200 parts of water, heated to 100°C and the solution filtered hot. The aqueous filtrate is cooled to 15°–20°C and basified with the addition of concentrated aqueous ammonia. The precipitated dyestuff is separated, washed alkali free with water and dried. 3.14 Parts of a greenish-yellow dyestuff of structure:

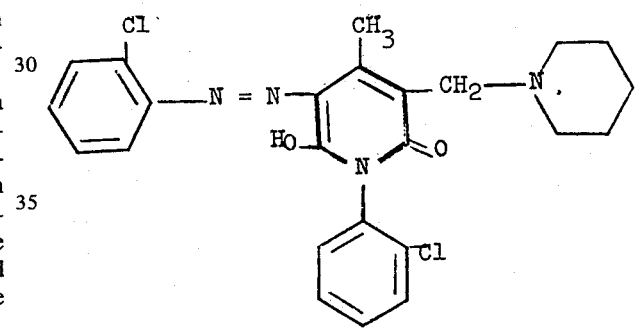

are obtained.

When the above dyestuff is ground with 0.80 parts of sulphuric acid, and the resulting mixture pasted with aqueous acetic acid, dissolved in water and applied to polyacrylonitrile fibre, a bright greenish yellow dyeing with excellent fastness to light and washing and very good compatibility properties is obtained.

The following dyestuffs can be obtained in a similar manner to that described in the foregoing example. The diazo component, pyridone coupling component, secondary amine used in Mannich reaction dye structure and shade on polyacrylonitrile are included in the following table:

| Ex. | diazo component | pyridone coupling component | Amine used in Mannich reaction | dye structure | Shade on polyacrylonitrile |
|---|---|---|---|---|---|
| 2 | 2-chloroaniline | 1-phenyl-4-methyl-6-hydroxypyrid-2-one | piperidine | 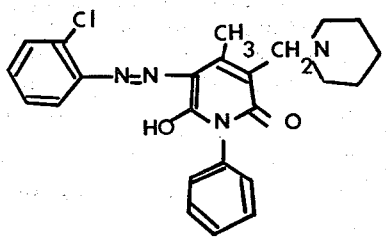 | greenish-yellow |
| 3 | 2-chloroaniline | 1-(2'-methylphenyl)-4-methyl-6-hydroxy-pyrid-2-one | " | 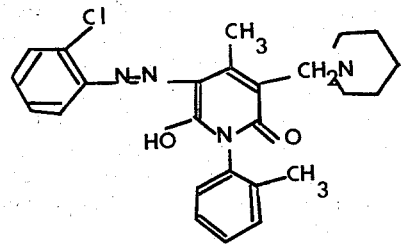 | " |
| 4 | " | 1-(2'-chlorophenyl)-4-methyl-6-hydroxy-pyrid-2-one | diethylamine | 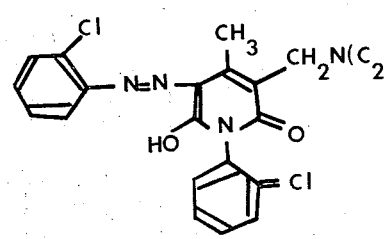 | " |
| 5 | " | " | dimethylamine | 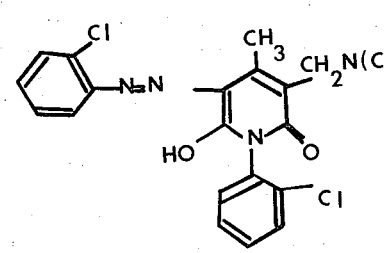 | " |
| 6 | 2,5-dichloroaniline | 1-phenyl-4-methyl-6-hydroxypyrid-2-one | piperidine | 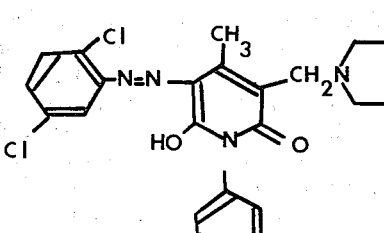 | greenish-yellow |
| 7 | " | 1-(2'-chlorophenyl)-4-methyl-6-hydroxy-pyrid-2-one | " | 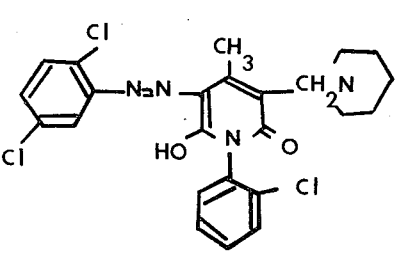 | " |
| 8 | " | 1-phenyl-4-methyl-6- | morpholine | 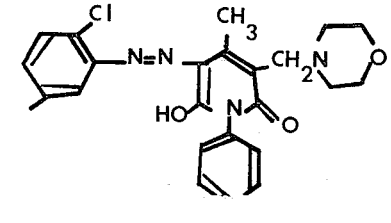 | " |

| Ex. | diazo component | pyridone coupling component | Amine used in Mannich reaction | dye structure | Shade on polyacrylonitrile |
|---|---|---|---|---|---|
| | | hydroxypyrid-2-one | | | |
| 9 | 2-chloroaniline | 1-(4'-methylphenyl)-4-methyl-6-hydroxy-pyrid-2-one | piperidine | (structure shown) | " |

EXAMPLE 10

1 Part of the dyestuff described in Example 1 is dissolved in a mixture of 2 parts of acetic acid and 2 parts of water. A mobile liquid formulation of the dyestuff, which does not crystallize on low temperature storage, is obtained.

Further examples of the dyestuffs of the invention were made from the tabulated diazo and coupling components followed by reaction with formaldehyde and the indicated amines.

EXAMPLE 22

5.83 parts of the dyebase 1-ethyl-4-methyl-5-(2'-chlorophenylazo)-6-hydroxypyrid-2-one is stirred under reflux for 20 hours in 50 parts dioxan containing paraformaldehyde equivalent to 5 moles formaldehyde/mole dyebase and 5 parts conc. hydrochloric acid. The reaction liquor is then cooled to room temperature and the crystalline product filtered, washed with a little methanol and dried. The crude product is then recrystallized from toluene.

| Example | Diazo Component | Pyridone Coupler | Amine used in Mannich reaction |
|---|---|---|---|
| 11 | 4-carbethoxy aniline | 1-(4'-chlorophenyl)-6-hydroxy-4-methylpyrid-2-one | di-isopropylamine |
| 12 | 2-chloro-4-cyanoaniline | 1-(4'-methoxyphenyl)-6-hydroxy-4-methylpyrid-2-one | diethanolamine |
| 13 | 2-trifluoromethylaniline | 1-(2'-nitrophenyl)-6-hydroxy-4-methylpyrid-2-one | N-ethyl-N-(2-cyanoethyl)amine |
| 14 | 4-aminoacetophenone | 1-(4'-bromophenyl)-6-hydroxy-4-methylpyrid-2-one | N-methyl ethanolamine |
| 15 | 4-aminobenzophenone | 1-(2'-cyanophenyl)-6-hydroxy-4-methylpyrid-2-one | N-methyl(3'-methoxy propylamine) |
| 16 | 2-bromoaniline | 1-(4'-trifluoromethylphenyl)-6-hydroxy-4-methylpyrid-2-one | pyrrolidine |
| 17 | 4-methoxy-2-chloroaniline | 1-(4'-methoxycarbonylphenyl)-6-hydroxy-4-methylpyrid-2-one | hexahydroazepine |
| 18 | 4-ethyl-2-bromoaniline | 1-(2'-chlorophenyl)-6-hydroxy-4-phenylpyrid-2-one | N-methyl benzylamine |
| 19 | 2-chloroaniline | 1-(2'-chlorophenyl)-6-hydroxy-4-ethylpyrid-2-one | N-methyl cyclopentylamine |
| 20 | 2-chloroaniline | 1-(2'-chloro-4'-methylphenyl)-6-hydroxy-4-methylpyrid-2-one | pyrrolidine |
| 21 | 2-chloroaniline | 1-naphthyl-6-hydroxy-4-methylpyrid-2-one | morpholine |

The above dyestuffs applied to polyacrylonitrile fibre as aqueous solutions of their salts with organic or inorganic acids all gave bright greenish yellow shades of good fastness properties.

1.75 parts of the chloromethylated dyebase prepared above is then heated on a steam bath for 1–2 hours with 10 parts piperidine. The reaction mass is then cooled, diluted with petroleum ether (b.p. 40°–60°C), the solid filtered, washed with petroleum ether and dried. The dyestuff obtained has the following structure

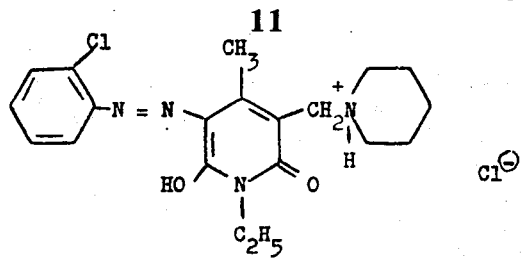

and dyes polyacrylonitrile a greenish yellow shade from an acetic acid dyebath.

We claim:

1. Azo dyestuff free from carboxylic acid or sulphonic acid groups selected from the group consisting of
   a. a dyestuff of the formula

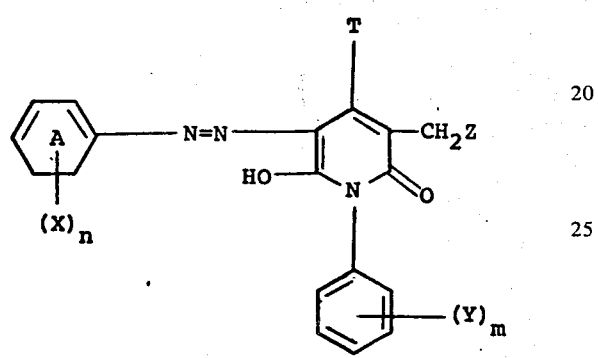

wherein
X is chlorine, bromine, iodine, —COOCH$_3$, —COOC$_2$H$_5$, —COCH$_3$, —COC$_6$H$_5$, —COC$_2$H$_5$, cyano or trifluoromethyl,
Y is hydrogen, methyl, ethyl, methoxy, ethoxy, chlorine, bromine, nitro, cyano, —COOCH$_3$, —COOC$_2$H$_5$, —COCH$_3$, —COC$_2$H$_5$, trifluoromethyl or alkylene forming with the phenyl ring 1-naphthyl,
Z is

T is lower alkyl or phenyl,
the ring A can be substituted with (X)$_n$ alone or further substituted with lower alkyl or methoxy,
m is 1 or 2 and
n is 1 or 2 and
   b. a salt of the dyestuff of (a) with an acid selected from the group consisting of hydrochloric acid, sulfuric acid, phosphoric acid, sulphamic acid, boric acid, formic acid, acetic acid, propionic acid, citric acid, oxalic acid and mono-, di- and trichloracetic acid.

2. The azo dyestuff of claim 1 wherein Z is —NR$^1$R$^2$ wherein R$^1$ and R$^2$ each independently represent methyl, ethyl, isopropyl, tert-butyl, β-hydroxyethyl, β-cyanoethyl, γ-methoxy propyl, allyl, cyclopentyl, cyclohexyl, chlorocyclohexyl, methoxycyclohexyl, benzyl, β-phenylethyl, p-nitrobenzyl, p-methoxybenzyl or β-(4-chlorophenyl)ethyl, or
R$^2$ is phenyl, o-, m- or -p-tolyl, o-, m- or -p-chlorophenyl or p-methoxyphenyl, or
R$^1$ and R$^2$ together with the nitrogen atom to which they are attached form piperidino, morpholino, pyrrolidino, thiamorpholino, piperizino or hexahydroazepino.

3. Azo dyestuff free from carboxylic acid or sulphonic acid groups selected from the group consisting of
   a. a dyestuff of the formula

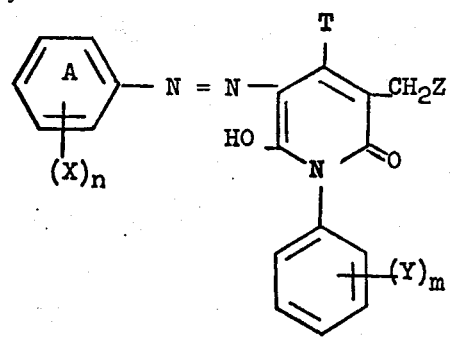

wherein
X is chlorine, bromine, —COOC$_2$H$_5$, cyano, trifluoromethyl, —COCH$_3$ or —COC$_6$H$_5$,

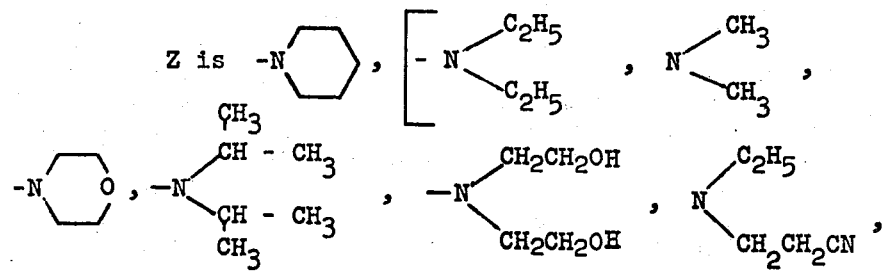

T is methyl, ethyl or phenyl,
Y is hydrogen, chlorine, methyl, methoxy, nitro, bromine, cyano, trifluoromethyl, —COOCH$_3$ or alkylene forming with the phenyl ring 1-naphthyl,
m is 1 or 2 and
n is 1 or 2.

4. The azo dyestuff of claim 3 wherein the ring A is further substituted with methoxy or ethyl.

5. The azo dyestuff of claim 1 having the formula:

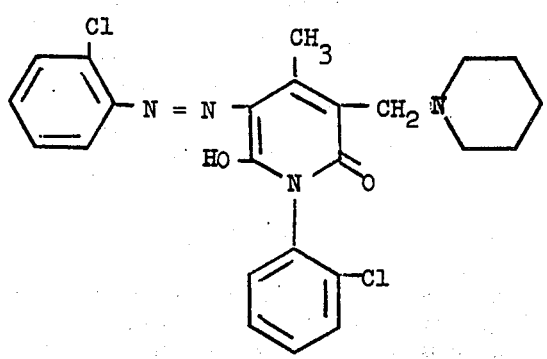

6. The azo dyestuff of claim 1 having the formula:

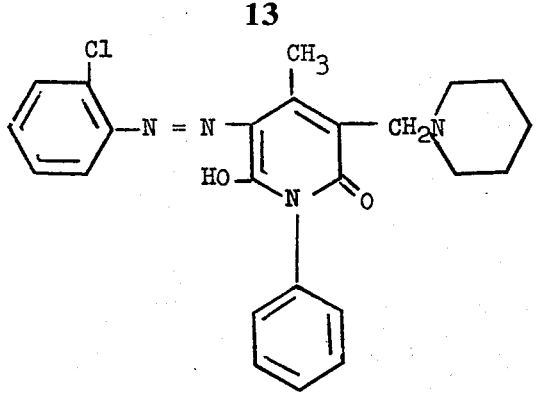
7. The azo dyestuff of claim 1 having the formula:
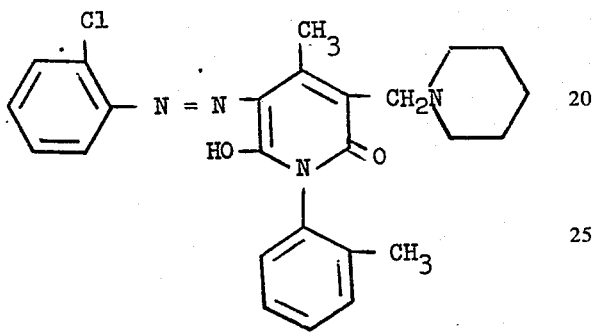
8. The azo dyestuff of claim 1 having the formula:
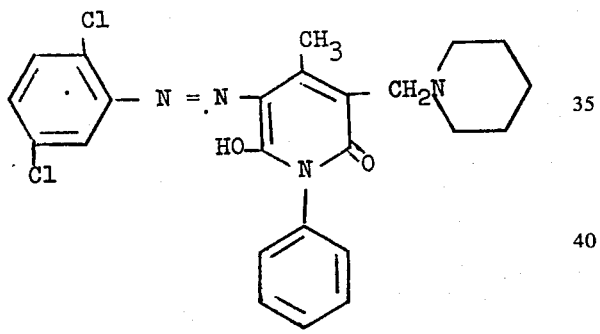
9. The azo dyestuff of claim 1 having the formula:
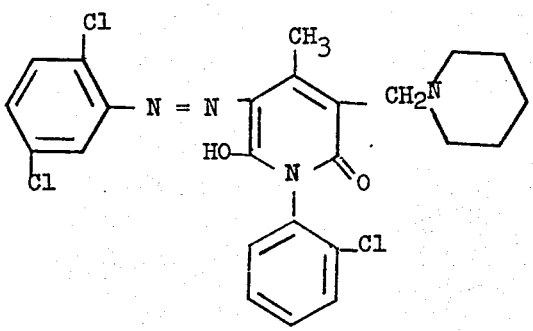
10. The azo dyestuff of claim 1 having the formula:
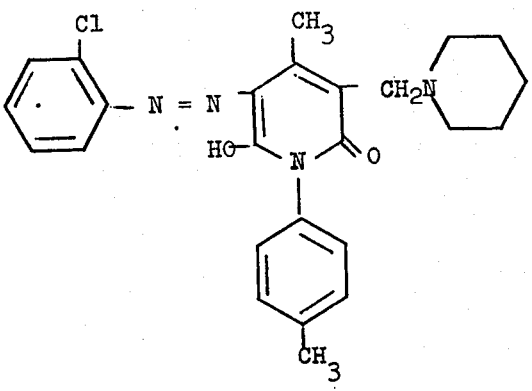
* * * * *